Dec. 4, 1928.　　　　　　　　　　　　　　　　　　　1,693,921
S. B. HASELTINE
FRICTION SHOCK ABSORBING MECHANISM
Filed Sept. 2, 1927　　　2 Sheets-Sheet 2
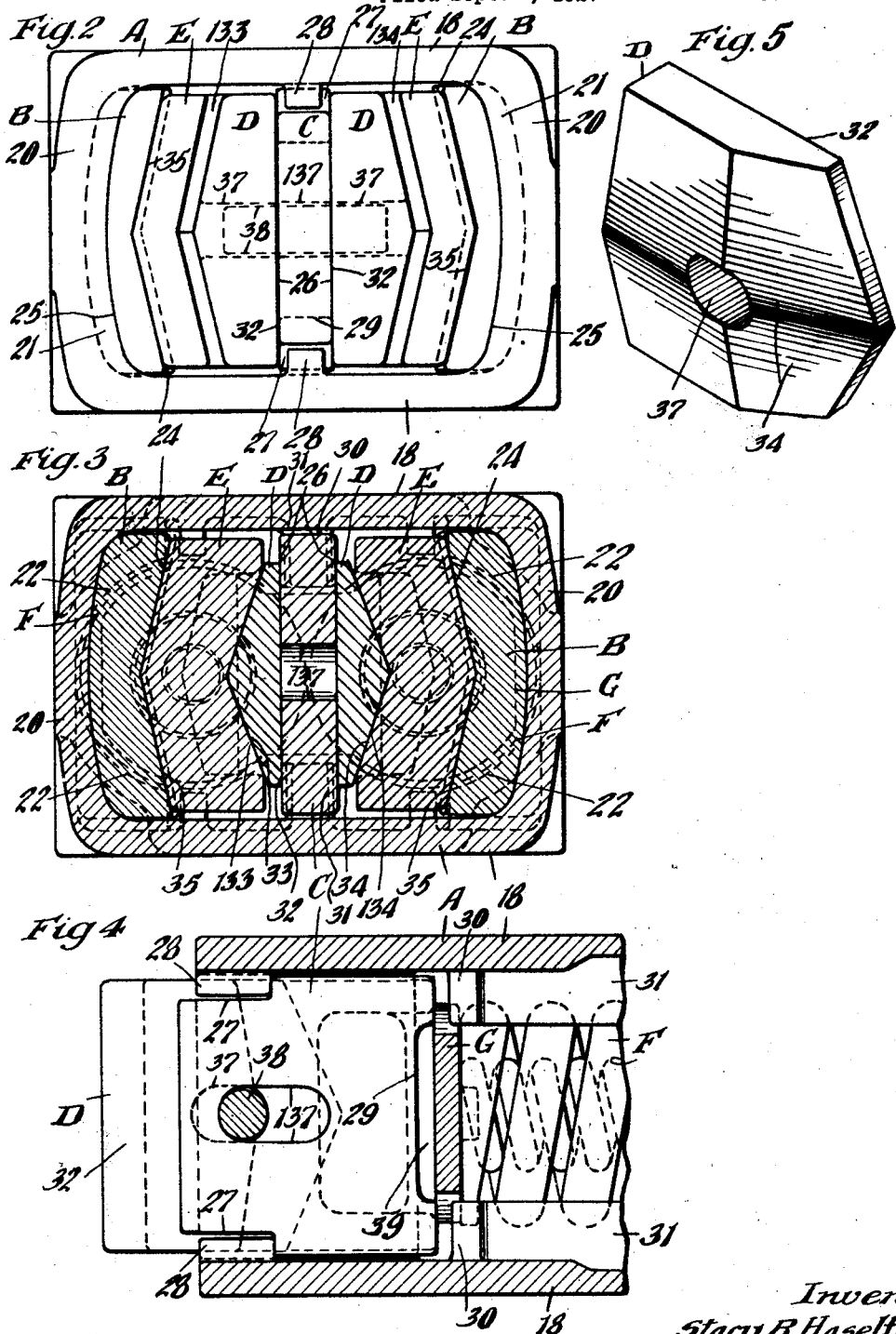
Witness
Wm. Geiger
Inventor
Stacy B. Haseltine
By George L. Haight
His Atty.

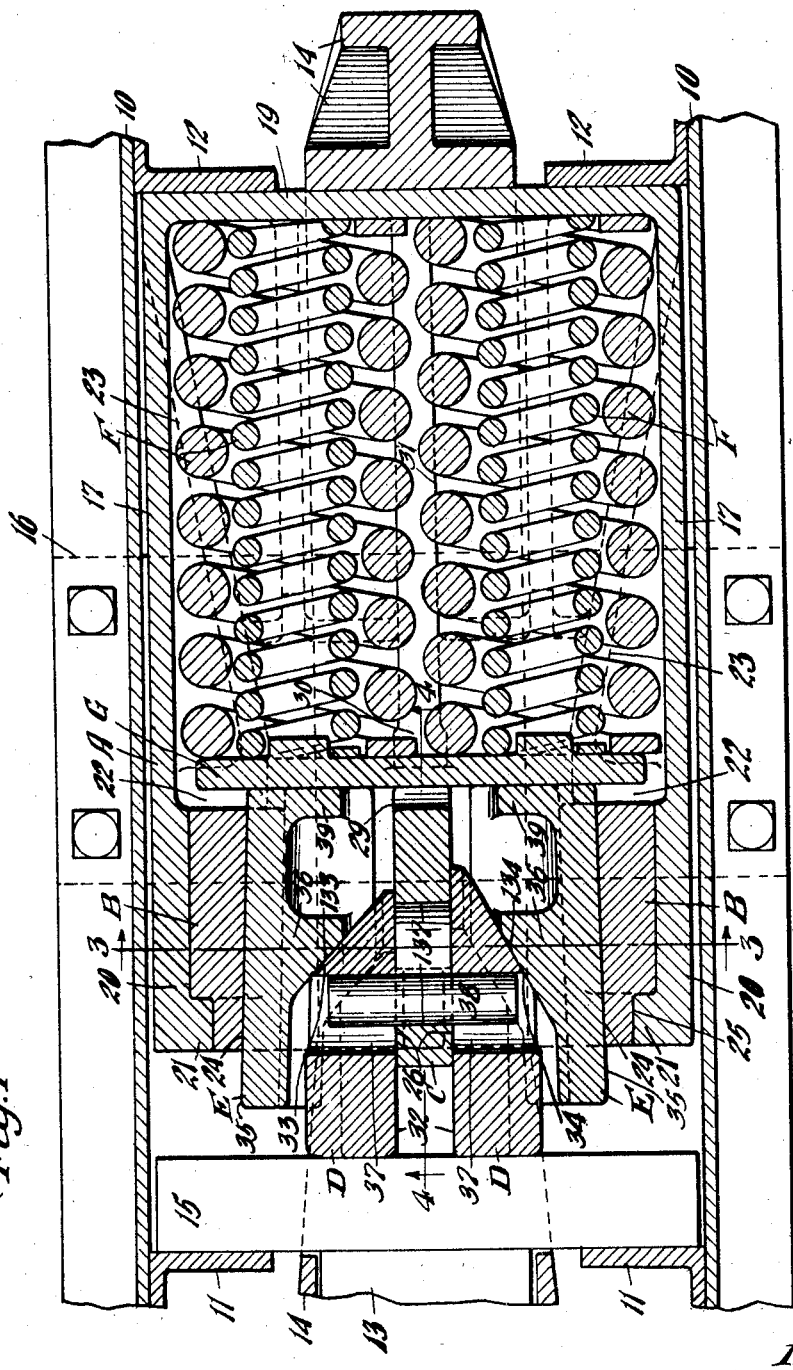

Patented Dec. 4, 1928.

1,693,921

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 2, 1927. Serial No. 217,233.

This invention relates to improvements in friction shock absorbing mechanisms.

One object of the invention is to provide a friction shock absorbing mechanism, especially adapted for railway draft riggings including a friction casing having only a part of the walls thereof provided with friction surfaces and a friction system cooperating therewith, wherein the elements of the friction system are interlocked with each other so as to limit the relative movement thereof and the movement of the friction system with respect to the casing to a direction longitudinally of the mechanism, thereby holding the movable elements spaced from the portion of the walls of the casing not provided with friction surfaces to prevent wear of the casing.

A more specific object of the invention is to provide in a friction shock absorbing mechanism of the character indicated a friction shell having opposed friction surfaces, a central friction member having plain, flat friction surfaces on opposite sides thereof, and a friction wedge means cooperating with the friction shell and central friction member, wherein the friction means includes a plurality of cooperating elements having interengaging surfaces limiting movement of the parts of the friction means to a direction longitudinally of the mechanism, thereby preventing wear of the inactive inner surfaces of the walls of the shell.

A still further object of the invention is to provide, in a friction shock absorbing mechanism of the character described, simple and efficient means for holding the parts assembled.

Other objects of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Figure 2 is a front end elevational view of the shock absorbing mechanism proper. Figure 3 is a vertical, transverse sectional view corresponding substantially to the line 3—3 of Figure 1. Figure 4 is a longitudinal, vertical, sectional view of the forward end portion of the shock absorbing mechanism proper, corresponding substantially to the line 4—4 of Figure 1. And Figure 5 is a detail perspective view of one of the wedge elements employed in connection with my improved mechanism.

In said drawings, 10—10 indicate channel shaped center or draft sills of a railway car underframe, to the inner surfaces of which are secured the usual front stop lugs 11—11 and rear stop lugs 12—12. The rear end portion of the draw bar is designated by 13, to which is operatively connected a yoke 14 of well known form. The shock absorbing mechanism proper and a front main follower 15 are disposed within the yoke, and the yoke in turn is supported in operative position by a saddle plate 16 detachably secured to the draft sills 10.

My improved shock absorbing mechanism proper, as shown, comprises broadly, a casing A provided with detachable liners B—B; a friction post C; two main wedge blocks D—D; two friction shoes E—E; twin arranged main spring resistance means F; and a spring follower G.

The casing A is in the form of a substantially rectangular box-like casting having longitudinally disposed spaced side walls 17—17, horizontally extending spaced top and bottom walls 18—18 and a transverse rear end wall 19. The end wall 19 cooperates with the stop lugs 12 in the manner of the usual rear follower. As most clearly shown in Figures 1, 2 and 4, the casing is open at the forward end and the side walls adjacent the forward end thereof are inwardly thickened, as indicated at 20. At the extreme outer ends, the side walls are provided with inwardly extending ribs 21—21 which cooperate with the liners, as hereinafter pointed out, to limit outward movement of the latter. At the inner extreme ends of the thickened portions of the side walls, the casing is provided with abutment shoulders 22—22 at the four corners thereof, the abutment shoulders being reinforced by rearwardly extending thickened sections 23 formed integral with the side walls 17 of the casing A. The casing A rearwardly of the thickened wall portions 20 presents the spring cage portion of the same, and the top and bottom walls together with the liners B at the forward end of the casing define the friction shell section thereof.

The liners B are of similar design, each being in the form of a relatively thick plate having flat V-shaped interior, longitudinally extending friction surfaces 24. The friction surfaces 24 of the two liners B are preferably converged inwardly of the mechanism, as most clearly shown in Figure 1. At the forward end portion, each liner B is cut away on the outer side thereof, as indicated at 25, to receive the rib 21 at the corresponding side of the casing A. The main body portion of the liner B rearwardly of the cut away section 25 is disposed between the rib 21 and the top and bottom abutment shoulders 22 at the same side of the casing A. As will be evident, the ribs 21 and the abutment shoulders 22 positively prevent longitudinal movement of the liners with respect to the casing.

The friction post C is in the form of a relatively heavy plate having flat friction surfaces 26—26 on the opposite sides thereof. The friction surfaces 26 extend longitudinally of the mechanism and are preferably disposed in parallel relation. At the top and bottom sides the post C is cut away at the forward end, as indicated at 27—27, to accommodate top and bottom central lugs 28—28 formed integral with the top and bottom walls 18—18 of the casing A. The lugs 28 co-operate with the rear end walls of the cut away portions at the forward end of the post to positively limit outward movement of the post. The inner end portion of the post is centrally cut away, as indicated at 29, to accommodate the spring follower G. Inward movement of the post C is limited by abutment shoulders 30 provided at the front ends of longitudinally disposed reinforcing ribs 31 formed integral with the top and bottom walls 18 of the casing A. As most clearly shown in Figures 1 to 4, inclusive, the reinforcing ribs 31 are disposed centrally of the casing between the two elements of the twin arranged main spring resistance F. As most clearly shown in Figures 1 and 4, the rear end of the post C is normally slightly spaced from the abutment faces 30 of the ribs 31 so as to provide a certain amount of relative motion between the post C and the casing A during the initial action of the mechanism.

The two wedge members or blocks D are of similar design, except as hereinafter pointed out, each having a plain, longitudinally extending flat friction surface 32 on the inner side thereof adapted to co-operate with the friction surface 26 at the same side of the post C. The front end portion of each wedge block D presents a transverse flat face bearing directly on the inner side of the main follower 15. At the inner end each wedge block D is provided with a wedge face adapted to cooperate with one of the friction shoes E, the wedge face of one of the blocks being designated by 33 and that of the other block being designated by 34. The wedge face 33 is preferably disposed at a relatively blunt releasing angle with respect to the longitudinal axis of the mechanism, while the wedge face 34 is disposed at a keen wedge-acting angle with respect to said axis. Each of the wedge blocks D is provided with a transverse pin receiving opening 37 accommodating an anchoring pin 38 extending through an opening 137 in the post C. As most clearly shown in Figure 1, the openings 37 and 137 permit a certain amount of lost motion between the pin, post and wedge blocks, thus allowing the necessary relative movement between the parts during compression of the mechanism. The anchoring pin 38 serves to limit outward movement of the wedge blocks D—D and holds the same assembled with the mechanism, the post being held against outward movement by the lugs 28 on the casing A, as hereinbefore pointed out. The wedge faces 33 and 34 of the wedge blocks are of V-shaped section, as most clearly shown in Figures 2 and 3 and interfit with similar wedge-shaped faces on the friction shoes E—E, thereby preventing relative displacement of the shoes E—E and the wedge blocks D—D.

The friction shoes E, which are two in number, are disposed at opposite sides of the mechanism and are disposed between the friction surfaces of the liners B and the wedge blocks D. The two shoes E are of similar design, except as hereinafter pointed out. Each shoe is provided with an outer friction surface 35 adapted to cooperate with the friction surface 24 of the corresponding liner B. The friction surfaces 35 of the shoes E are of V-shaped section so as to interfit with the V-shaped surfaces 24 of the liners B, thus preventing relative vertical displacement of the shoes E and the liners B and limiting the movement of the shoes E to a direction longitudinal of the mechanism. On the inner side each shoe E is provided with a lateral enlargement 36 having a front inner wedge face cooperating with the wedge face of the wedge block D at the same side of the mechanism. The wedge face of the shoe E, which cooperates with the wedge face 33 of the wedge blocks, is designated by 133, while the wedge face of the remaining friction shoe E is designated by 134. The wedge faces 133 and 134 are of V-shaped section so as to interfit the wedge faces of the wedge blocks D—D, thereby preventing relative displacement in a vertical direction of the shoes E and wedge blocks D. The wedge face 133 is disposed at a relatively blunt angle with respect to the longitudinal axis of the mechanism so as to properly cooperate with the wedge face 33 of the wedge block D, and the wedge face 134 of the remaining shoe E is disposed at a relatively keen wedging angle with respect to the longitudinal axis of the mechanism so as to properly cooperate with the wedge face 34 of the remaining wedge block D. The friction shoes E have rearward extensions which are laterally enlarged as indicated at 39 bearing on the front face of the spring follower G.

The main spring resistance element F comprises twin arranged elements, each element including an inner coil and a relatively heavier outer coil. The opposite ends of the twin arranged spring elements bear directly on the end wall 19 of the casing A and the inner side of the spring follower G.

As most clearly shown in Figure 1, the spring follower G is in the form of a substantially rectangular plate having spaced rearwardly projecting bosses thereon engaging within the inner coils of the spring resistance elements to maintain the springs properly centered with respect to the spring follower. In the normal position of the parts, the spring follower is spaced from the inner ends of the liners B—B so as to permit a certain amount of outward movement of the spring follower to compensate for wear of the various friction and wedge faces of the mechanism. The twin arranged main spring resistance elements F are placed under initial compression, when the mechanism is assembled, and due to the tendency of these springs to expand the spring follower G is urged outwardly so as to compensate for wear as hereinbefore pointed out. Due to the tendency of the springs to expand, the liners B are also maintained in their anchored position with respect to the casing A, the wedging action between the wedge blocks D and the friction shoes E under the influence of the main spring resistance F forcing the liners B apart.

In assembling the mechanism the main spring resistance elements F and the spring follower G are first inserted into the casing. The liners B are then placed in position and the friction post C engaged in back of the lugs 28 of the casing A. The friction shoes and wedge blocks D—D are then inserted, the shoes being forced inwardly against the springs F to an extent to permit insertion of the pin through the openings in the post and wedge blocks. The pressure on the shoes is then removed, whereupon the expansive action of the springs will force the parts to the position shown in Fig. 1.

Assuming a compression stroke, the operation of my improved mechanism is as follows: The main follower 15 and the casing A will be moved relatively toward each other, thereby carrying the wedge blocks D inwardly of the casing. Due to the angularity of the keen wedge faces 34 and 134 of one of the wedge blocks D and the corresponding shoe E, a wedging action will be set up, thus forcing the friction shoes into intimate contact with the friction surfaces of the liners and the friction surfaces of the wedge blocks D into intimate contact with the friction surfaces of the post C while the parts are moved inwardly also. On account of the friction thus produced between the wedge blocks D and the post C the latter will be carried inwardly in unison with the wedge blocks D during the initial compression of the mechanism until the clearance between the inner end of the post C and the abutment shoulders 30 is taken up. Upon engagement of the post C with the shoulders 30 movement of the post will be stopped and the wedge blocks D will be forced to slip on the friction surfaces of the post. Due to the converging relation of the opposed friction surfaces of the liners, the shoes E—E at opposite sides of the mechanism will be forced to approach each other. The lateral approach of the shoes E is accommodated by the cooperating blunt wedge faces 33 and 133.

During the described action there will be a slight lateral displacement of the post C and this is permitted inasmuch as the post C is anchored to the casing A in such a manner as to limit the longitudinal movement thereof only. Due to the fact that the cooperating wedge faces of the wedge blocks D and the friction shoes E and the cooperating friction surfaces of the shoes E and the liners B are of V-shaped section, movement of the entire friction means is limited to a direction longitudinal of the mechanism, thereby preventing dragging of the shoes and wedge blocks on the top and bottom walls of the casing A. As most clearly shown in Figures 2, 3 and 4, the top and bottom sides of the shoes E are spaced slightly from the top and bottom walls of the casing A in all positions of the parts and the wedge blocks D—D are also spaced from the top and bottom walls referred to. The compression action of the mechanism will continue either until the actuating force is reduced or inward movement of the follower 15 is limited by engagement with the front end of the casing A. Upon movement of the follower 15 being limited by engagement with the casing A, the forces will be transmitted directly through the casing, the latter acting as a solid column load transmitting member to prevent the main springs F from being unduly compressed.

During release of the mechanism upon the acting force being reduced, the expansive action of the spring resistance means F forces the spring follower G outwardly, the latter carrying the friction shoes E—E outwardly therewith, the shoes in turn forcing the wedge blocks outwardly also. During the first part of the releasing action, the friction post C, due to the friction existing between the same and the wedge blocks D, will be carried outwardly in unison with the wedge blocks until limited by engagement with the lugs 28. Upon movement of the post C being arrested, the wedge blocks D will be forced to slide outwardly of the post until movement thereof is limited by engagement of the pin 38. Upon movement of the wedge blocks D being stopped, the friction shoes E will also have their movement arrested due to the interengaging wedge faces of the friction shoes and wedge blocks. In this manner all of the parts of the mechanism are restored to the normal position illustrated in Figure 1.

The releasing action of the mechanism is greatly facilitated by the initial outward movement of the friction post and by the action of the blunt releasing wedge faces 33 and 133.

While I have herein shown and described the preferred manner of carrying out my invention, the same is merely illustrative, and I contemplate all changes and modifications which come within the scope of the claims appended hereto.

I claim:

1. In a friction shock absorbing mechanism, the combination with a casing provided with opposed side walls and top and bottom walls; of a spring resistance within the casing; a pair of detachable liners mounted on the side walls of the casing; means for preventing relative longitudinal movement of said liners and casing, said liners being held against vertical displacement; a pair of friction shoes cooperating with the liners; a central friction post; a pair of wedge blocks on opposite sides of the post and relatively movable thereto, said wedge blocks having wedging engagement with the shoes, said wedge blocks, shoes and liners being provided with interengaging means for holding all of said parts centered on the side walls of the casing and uniformly spaced from the remaining walls respectively.

2. In a friction shock absorbing mechanism, the combination with a casing having a spring cage section and a friction shell section, said casing being provided with opposed walls presenting interior friction surfaces; of a spring resistance within the cage; a central friction post within the friction shell; a pair of friction shoes cooperating with the friction surfaces of the shell; a pair of wedge blocks having wedging engagement with the shoes and frictional engagement with the post, said wedge blocks and post being relatively movable, said wedge blocks and shoes having interengaging means thereon for limiting movement of the same to a direction longitudinal of the mechanism.

3. In a friction shock absorbing mechanism, the combination with a rectangular friction shell having top, bottom and side walls, said side walls being provided with longitudinally disposed friction surfaces; of a pair of friction shoes having friction surfaces interengaged with the friction surfaces of the shell to hold said shoes and shell against displacement vertically and maintain the shoes spaced from the top and bottom walls of the shell; a wedge block cooperating with each shoe, said wedge blocks and shoes having interengaging wedge faces preventing vertical displacement of the wedge blocks and shoes and maintaining the wedge blocks spaced from the top and bottom walls of the shell; a central friction post having flat friction surfaces cooperating with the friction surfaces of the wedge blocks, said post and wedge blocks being relatively movable; and spring means within the cage opposing inward movement of the shoes.

4. In a friction shock absorbing mechanism, the combination with a casing having opposed side walls; of a main follower, said main follower and casing being relatively movable toward and away from each other; a central friction member within the casing; a wedge block disposed on each side of said friction element, said wedge blocks being movable with the main follower and relatively movable to the central friction element; a pair or friction shoes cooperating with the wedge blocks, said wedge blocks and shoes having cooperating V-shaped wedge faces, and said shoes and opposed casing wall also having interengaging V-shaped friction surfaces; and a main spring resistance opposing inward movement of the friction shoes.

5. In a friction shock absorbing mechanism, the combination with a friction shell having opposed inwardly converging friction surfaces; a central friction post disposed within said casing; a pair of pressure transmitting wedge elements having frictional engagement with the post and movable relatively thereto; friction shoes interposed between the wedge pressure transmitting members and casing walls, said shoes and wedge pressure transmitting members having cooperating sets of interengaging wedge faces limiting relative movement of the wedge pressure transmitting members and shoes to a direction longitudinal of the mechanism, the cooperating sets of wedge faces of one of said wedge pressure transmitting members and shoes being disposed at a keener angle with respect to the longitudinal axis of the mechanism than the cooperating wedge faces of the other set, said shoes and shell side walls having cooperating interengaging friction surfaces limiting movement of the shoes to a direction longitudinal of the shell; and spring resistance means yieldingly opposing inward movement of the shoes.

6. In a friction shock absorbing mechanism, the combination with a combined friction shell and spring cage, the friction shell section thereof being provided with detachable liners held against movement with respect to the combined cage and shell, said liners having opposed inwardly converging friction surfaces of V-shaped section; a central friction post having limited movement with respect to the combined cage and shell, said post having plain friction surfaces on the opposite sides thereof; a pair of wedge pressure transmitting blocks disposed at opposite sides of the post and having friction surfaces cooperating with the friction surfaces of the post, said blocks and post being relatively movable; a friction shoe interposed between each wedge block and liner, said shoes and wedge blocks having cooperating wedge faces of V-shaped section; and twin spring resistance means disposed within the spring cage and opposing inward movement of the friction shoes.

7. In a friction shock absorbing mechanism, the combination with a casing having opposed interior friction surfaces; of a friction post within the casing; means on the casing for limiting inward movement of the post; cooperating abutment means on the post and casing for limiting outward movement of the post; a pair of wedge blocks having frictional engagement with the post and being relatively movable thereto; anchoring means connecting the wedge blocks and post to limit outward movement of the wedge blocks; friction shoes interposed between the wedge blocks and the friction surfaces of the casing, said shoes and wedge blocks having cooperating wedge faces; and main spring resistance means within the casing and opposing inward movement of the friction shoes.

8. In a friction shock absorbing mechanism, the combination with a casing having interior opposed friction surfaces; of a friction post within the casing; abutment means on the casing for limiting outward movement of the post; wedge blocks on opposite sides of the post and having frictional engagement therewith and being relatively movable thereto; friction shoes interposed between the friction surfaces of the casing and wedge blocks; an anchoring pin having a lost motion connection with the post and wedge blocks to limit outward movement of the wedge blocks; and main spring resistance means within the casing and opposing inward movement of the friction shoes.

9. In a friction shock absorbing mechanism, the combination with a friction shell having opposed friction surfaces; a central post within the shell, having limited movement with respect thereto, said post presenting flat outer friction surfaces; a split wedge comprising a pair of members disposed on opposite sides of the post and having frictional engagement with the friction surfaces thereof; a pair of friction shoes having wedging engagement with the split wedge, said shoes also having friction surfaces cooperating with the friction surfaces of the shell, the cooperating friction surfaces of the shoes and shell and the cooperating wedge faces of the split wedge and shoes interengaging to limit movement of the shoes and split wedge to a direction longitudinal of the mechanism; and a main spring resistance opposing inward movement of the friction shoes.

In witness that I claim the foregoing I have hereunto subscribed my name this 30th day of August, 1927.

STACY B. HASELTINE.